(12) United States Patent
Hellebust et al.

(10) Patent No.: US 9,699,626 B2
(45) Date of Patent: *Jul. 4, 2017

(54) FILTERED IN-BOX FOR VOICEMAIL, E-MAIL, PAGES, WEB-BASED INFORMATION, AND FAXES

(71) Applicant: AT&T Mobility II LLC, Atlanta, GA (US)

(72) Inventors: Kent A. Hellebust, Woodinville, WA (US); Thomas J. Trinneer, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,820

(22) Filed: Jun. 3, 2014

(65) Prior Publication Data
US 2014/0287727 A1   Sep. 25, 2014

Related U.S. Application Data

(63) Continuation of application No. 12/388,418, filed on Feb. 18, 2009, now Pat. No. 8,742,893, which is a (Continued)

(51) Int. Cl.
| | | |
|---|---|---|
| *G08B 5/22* | (2006.01) |
| *H04Q 1/30* | (2006.01) |
| *G08B 29/00* | (2006.01) |
| *G06F 11/30* | (2006.01) |
| *H04Q 1/32* | (2006.01) |
| *H04W 4/12* | (2009.01) |
| *H04M 19/04* | (2006.01) |
| *H04M 1/725* | (2006.01) |

(52) U.S. Cl.
CPC ......... *H04W 4/12* (2013.01); *H04M 1/72547* (2013.01); *H04M 19/041* (2013.01)

(58) Field of Classification Search
CPC ............. G08B 5/22; G08B 29/00; H04Q 1/30
USPC ........ 340/7.5, 7.51, 5.79, 7.6; 455/458, 38.1
See application file for complete search history.

(56) References Cited

U.S. PATENT DOCUMENTS 4,837,798 A * 6/1989 Cohen et al. ............. 379/88.14
5,062,147 A * 10/1991 Pickett et al. ................. 714/46
(Continued)

OTHER PUBLICATIONS

Buonadonna et al. "Active Message Communication for Tiny Networked Sensors", pp. 1-11 (2001).
(Continued)

*Primary Examiner* — Nam V Nguyen
(74) *Attorney, Agent, or Firm* — Hartman & Citrin LLC

(57) ABSTRACT

The present invention is directed to a system for displaying, organizing, and prioritizing the incoming information on a wireless device. Using the present invention the wireless device can display the number of voice mails, e-mails, pages, and Internet information alerts that have been received by the wireless device during a specified time period. The invention also allows the incoming information to be separated by any number of user-specified criteria such as the originating sender, or divided by work related and personal messages. The present invention allows the wireless device user to see at a glance what kind of information has been received and is being stored on the wireless device.

16 Claims, 3 Drawing Sheets

Related U.S. Application Data continuation of application No. 10/644,641, filed on Aug. 19, 2003, now Pat. No. 7,511,603, which is a continuation of application No. 09/386,762, filed on Aug. 31, 1999, now Pat. No. 6,628,194.

(56) References Cited

U.S. PATENT DOCUMENTS

| | | | |
|---|---|---|---|
| 5,377,354 A | | 12/1994 | Scannell et al. |
| 5,559,860 A | * | 9/1996 | Mizikovsky ................ 455/413 |
| 5,579,472 A | | 11/1996 | Keyworth et al. |
| 5,584,248 A | * | 12/1996 | Sandsted ................ E01B 27/16 |
| | | | 104/12 |
| 5,604,491 A | * | 2/1997 | Coonley ................ G08B 5/229 |
| | | | 340/7.52 |
| 5,627,764 A | * | 5/1997 | Schutzman et al. .......... 709/207 |
| 5,673,322 A | | 9/1997 | Pepe et al. |
| 5,686,900 A | * | 11/1997 | Ono et al. .................... 340/7.52 |
| 5,705,995 A | | 1/1998 | Laflin et al. |
| 5,781,857 A | * | 7/1998 | Hwang et al. ............. 455/412.2 |
| 5,784,001 A | | 7/1998 | Deluca et al. |
| 5,796,394 A | | 8/1998 | Wicks et al. |
| 5,797,103 A | * | 8/1998 | Duda .......................... 455/567 |
| 5,815,800 A | * | 9/1998 | Su et al. ..................... 340/7.22 |
| 5,956,486 A | * | 9/1999 | Hickman et al. ............ 709/206 |
| 6,049,697 A | * | 4/2000 | Scozzarella ........ H04W 88/023 |
| | | | 340/7.31 |
| 6,061,570 A | | 5/2000 | Janow |
| 6,072,867 A | | 6/2000 | Lieuwen |
| 6,075,984 A | | 6/2000 | Murata |
| 6,141,686 A | | 10/2000 | Jackowski et al. |
| 6,157,630 A | | 12/2000 | Adler et al. |
| 6,212,550 B1 | * | 4/2001 | Segur .......................... 709/206 |
| 6,263,064 B1 | | 7/2001 | O'Neal et al. |
| 6,463,145 B1 | | 10/2002 | O'Neal et al. |
| 6,507,866 B1 | | 1/2003 | Barchi |
| 6,628,194 B1 | | 9/2003 | Hellebust et al. |
| 6,690,274 B1 | * | 2/2004 | Bristol ............... G05B 23/0267 |
| | | | 340/506 |
| 7,511,603 B2 | | 3/2009 | Hellebust et al. |
| 8,195,754 B2 | | 6/2012 | Beverly, IV |
| 8,204,945 B2 | | 6/2012 | Milliken et al. |
| 8,270,997 B2 | | 9/2012 | Sories et al. |
| 8,364,766 B2 | | 1/2013 | Zheng et al. |
| 2003/0195937 A1 | | 10/2003 | Kircher, Jr. et al. |
| 2004/0243580 A1 | | 12/2004 | Markki et al. |
| 2010/0306398 A1 | | 12/2010 | Chang et al. |

OTHER PUBLICATIONS

Dewdney et al. "The Form is the Substance: Classification of Genres in Text", Assoc for Computational Linguistics, pp. 1-8 (2001).
Esquivel et al. "On the effectiveness of IP reputation for spam filtering" COMSNETS, abstract (2010).
Microsoft (R) Outlook (R) 97 Adminstrator's Guide, 188pp (1997).
U.S. Office Action dated Feb. 23, 2005 in U.S. Appl. No. 10/644,641.
U.S. Office Action dated Oct. 17, 2005 in U.S. Appl. No. 10/644,641.
U.S. Advisory Action dated Jan. 10, 2006 in U.S. Appl. No. 10/644,641.
U.S. Office Action dated Apr. 21, 2006 in U.S. Appl. No. 10/644,641.
U.S. Office Action dated Sep. 21, 2006 in U.S. Appl. No. 10/644,641.
U.S. Advisory Action dated Jan. 3, 2007 in U.S. Appl. No. 10/644,641.
U.S. Office Action dated Jun. 29, 2007 in U.S. Appl. No. 10/644,641.
U.S. Office Action dated Jan. 18, 2008 in U.S. Appl. No. 10/644,641.
U.S. Office Action dated Sep. 3, 2008 in U.S. Appl. No. 10/644,641.
U.S. Notice of Allowance dated Nov. 18, 2008 in U.S. Appl. No. 10/644,641.
U.S. Office Action dated Jun. 16, 2010 in U.S. Appl. No. 12/388,418.
U.S. Office Action dated Dec. 16, 2010 in U.S. Appl. No. 12/388,418.
U.S. Office Action dated Aug. 20, 2013 in U.S. Appl. No. 12/388,418.
U.S. Notice of Allowance dated Jan. 23, 2014 in U.S. Appl. No. 12/388,418.

* cited by examiner

FILTERED IN-BOX FOR VOICEMAIL, E-MAIL, PAGES, WEB-BASED INFORMATION, AND FAXES

CROSS-REFERENCE TO RELATED APPLICATIONS

This application is a continuation of U.S. patent application Ser. No. 12/388,418, filed Feb. 18, 2009 (now U.S. Pat. No. 8,742,893), which is a continuation of U.S. patent application Ser. No. 10/644,641, filed Aug. 19, 2003 (now U.S. Pat. No. 7,511,603), which is a continuation of U.S. patent application Ser. No. 09/386,762, filed Aug. 31, 1999 (now U.S. Pat. No. 6,628,194), the entireties of which are herein incorporated by reference.

FIELD OF THE INVENTION

The present invention is directed to a method for organizing, prioritizing, and displaying incoming message information on a wireless device.

BACKGROUND OF THE INVENTION

In recent years, the functionality of wireless devices has expanded far beyond simple voice or pager communications. Wireless devices can now receive a variety of incoming messages including pages, e-mails, faxes, voicemails, and short message services such as weather or sports updates. In some cases the actual message, for example a voicemail, is not delivered directly to the wireless device due to memory, bandwidth, or other limitations, but rather a notification message is sent to the wireless device to notify the user that a message has arrived and is being stored at a remote location. These types of notification messages are known in the art as shown in U.S. Pat. No. 5,797,103, "Method and Apparatus For Informing A Remote Unit Of A Feature-Originated Call," incorporated herein by reference. The notification messages, as well as some actual messages, are generally stored within the wireless device. However, most wireless devices are only equipped with a small screen that displays a few short lines of text or small graphics. To view each item that has been sent to the wireless device, the user generally must scroll through a series of screens or menus and may be forced to examine all of the items of a particular type, or sometimes all of the items regardless of type in order to find the message of interest. Most wireless devices can be set to alert the user that a new message has arrived, but this feature is not very useful if it is alerting the user every few moments that something new has arrived. The user is likely to begin ignoring the alert or simply turn it off. This may result in important messages going unnoticed among a large number of unimportant messages.

For example, a user may subscribe to a number of services for his wireless device, including paging, a sports score service, and e-mail. With all of these services active on a typical evening when a variety of sporting events are in progress, the user may be receiving several messages every few minutes. If during this time the user receives an important page or e-mail from his or her boss, the message may go unnoticed among all the other messages and the user may miss an important work assignment.

The user of a wireless device can be easily overwhelmed when trying to keep track of and prioritize the myriad of pieces of information that are arriving at any given time. It would be desirable for the wireless device to be able to organize the incoming information in such a way that the user can quickly and easily recognize and distinguish between important and unimportant items.

SUMMARY OF THE INVENTION

The present invention provides a method for automatically organizing and prioritizing the incoming messages on a wireless communication device and displaying the messages accordingly. A predetermined set of rules is used to perform the organization and prioritization of the incoming messages. When a message arrives, it is analyzed to determine certain classification information about the message. This classification information is then used to organize the incoming message among the messages that are already being stored on or referenced on the wireless device. This information is also used to determine the priority of the incoming message. Depending on the level of priority assigned to the incoming message, the wireless device may alert the user that the new message has arrived or may just store the message for the next time the user chooses to check for messages. The wireless device may also update its display to reflect the various classification information that has been gathered about the messages presently being stored.

The present invention allows the user of a wireless communication device to subscribe to any number of services that send messages to the device, but the user maintains control over the way the incoming messages are handled to prevent being overwhelmed with information.

DETAILED DESCRIPTION

Figure 1:
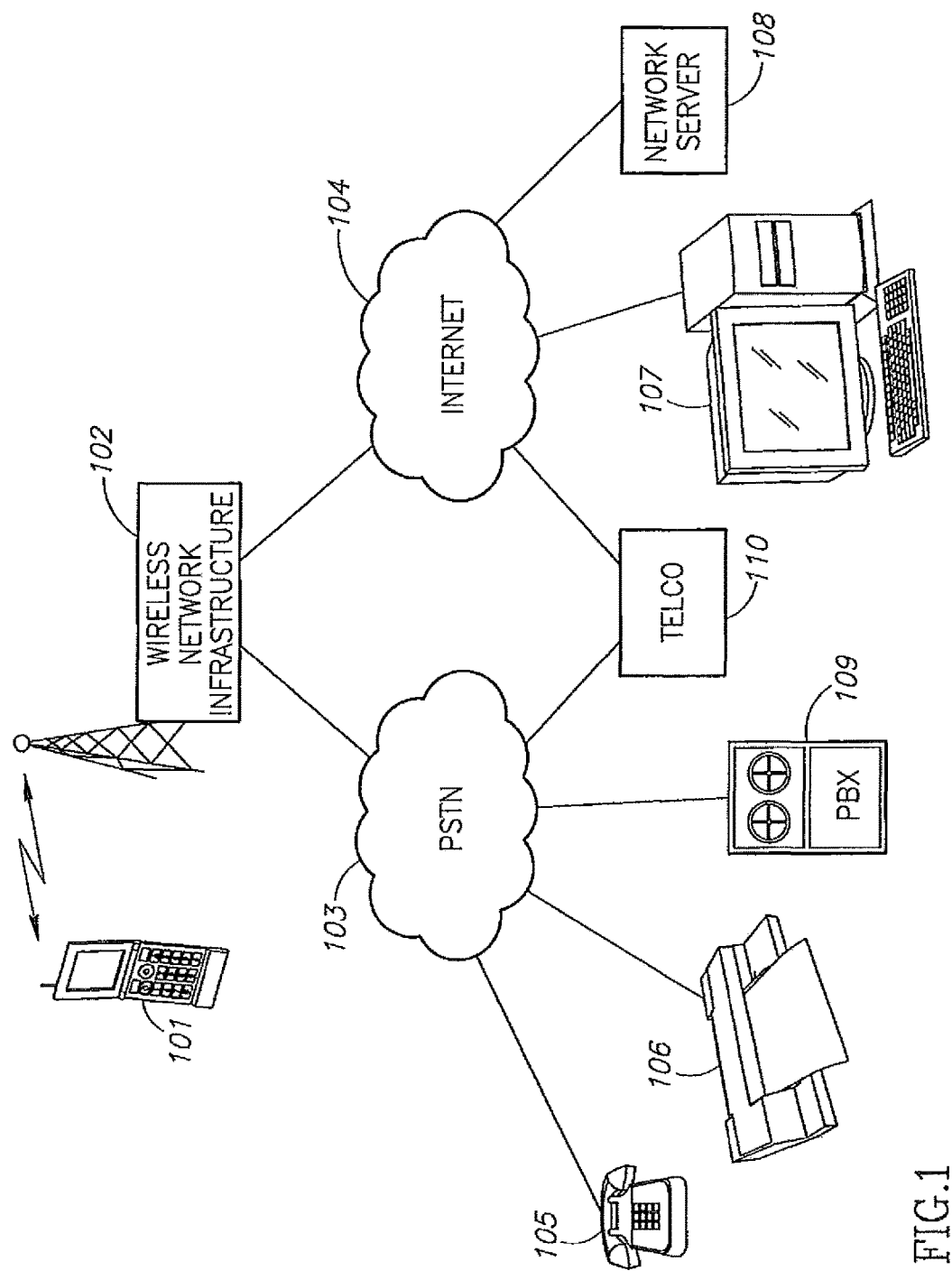
FIG. 1 illustrates a wireless network such as may be used with an embodiment of the present invention.

The present invention could be implemented within a wireless network similar to that depicted in FIG. 1. A wireless device 101 communicates with a wireless infrastructure 102 that is connected to a variety of public and private networks including the Public Switched Telephone Network (PSTN) 103 and the Internet 104. The user of the wireless device 101 subscribes to a variety of information services that send messages of various formats or types to the wireless device 101 via one of the networks to which wireless infrastructure 102 is connected. These services can include, but are not limited to, email, paging, voice mail, fax, and short message services (including short message based information services). These messages can originate from a variety of equipment such as telephone 105, fax machine 106, computer terminal 107, or network server 108 depending on the type of message. The equipment that sends the message will vary based on the type of message and some messages may pass through more than one type of equipment before delivery to the wireless device 101. For example, an individual may leave a voicemail message for the user of the wireless device 101 from telephone 105, but the voicemail will likely be stored on Private Branch Exchange equipment 109 or telephone company equipment 110 and the device storing the voicemail will send a notification message to the wireless device 101 to inform the user that the voicemail has arrived. Additionally, some types of messages can be sent from more than one type of equipment. For example, faxes may be sent from either fax machine 106 or computer terminal 107 if it is equipped with fax software.

Figure 2:
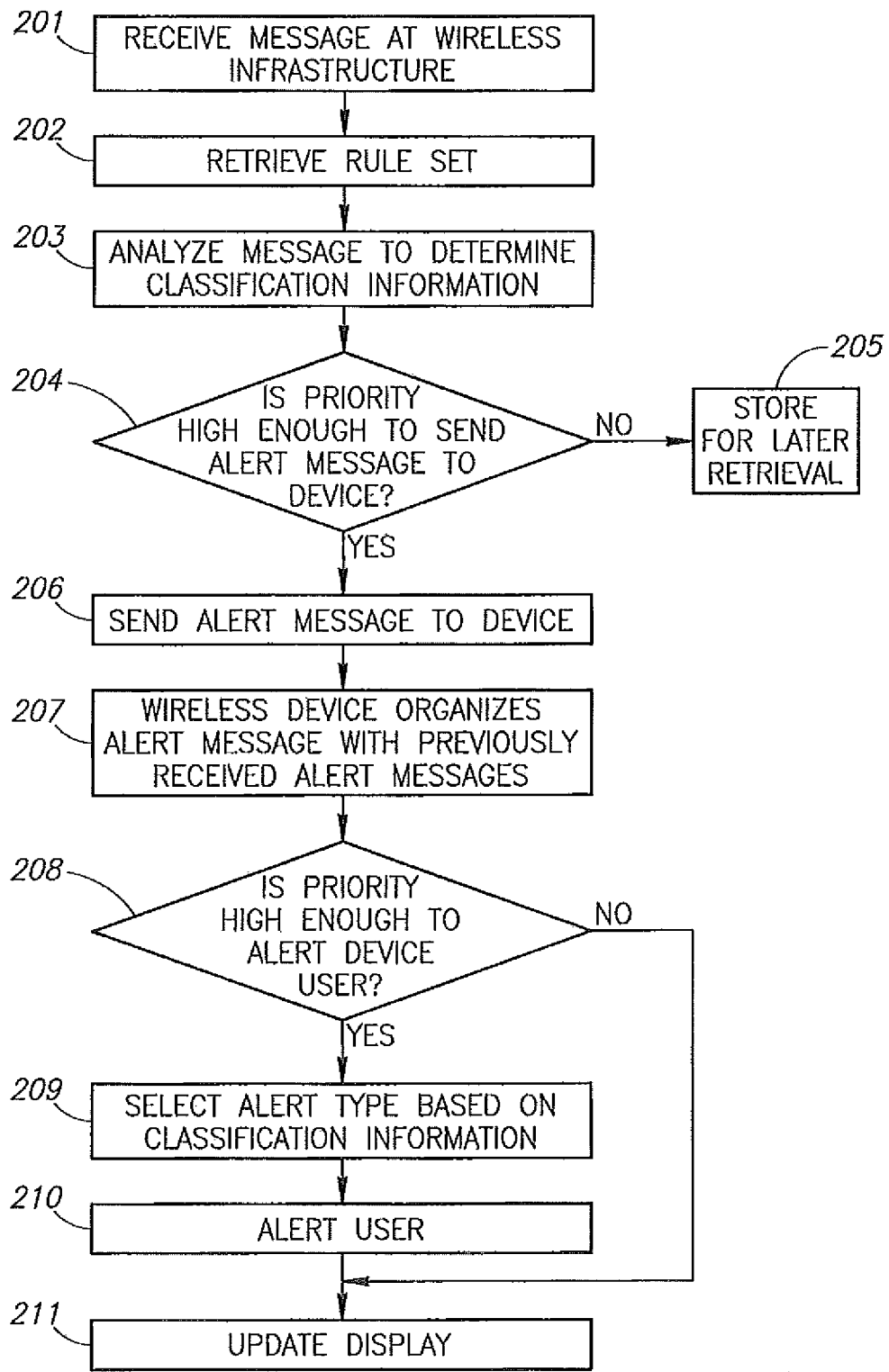
FIG. 2 is a flowchart illustrating one possible implementation of the method of the present invention.

FIG. 2 illustrates one possible way of implementing the present invention where much of the processing of the incoming messages is performed in the wireless infrastructure 102. A message for the user of wireless device 101 is received by wireless infrastructure 102 (step 201). The wireless infrastructure 102 then retrieves a set of rules corresponding to the user for which the message is intended from a database either co-located with the wireless infrastructure 102 or at a remote location and accessible to the wireless infrastructure 102 via a computer network (step 202). Using these rules, the wireless infrastructure 102 analyzes the message and determines classification information about the message (step 203). Based on this classification information, the wireless infrastructure 102 can assign a priority to the message if desired; and if this priority is not very high the wireless infrastructure 102 may elect not to send the alert message to the device 101, instead saving the alert message for later retrieval (step 204, 205). If the priority is sufficiently high, the wireless infrastructure 102 sends an alert message to the wireless device 101 containing the classification information about the received message (step 206). This alert message can optionally contain part or the entire contents of the original message along with the classification information. Once the wireless device 101 receives the alert message, it organizes and prioritizes the incoming message with the messages already stored on the wireless device 101 using the classification information and pre-assigned priority information (if available) associated with the incoming message and the classification information that was previously determined for and associated with each of the stored messages (step 207). The wireless device 101 then checks to see if the incoming message has been designated of a sufficient priority level to alert the user of the wireless device 101 that it has arrived (step 208). If so, the wireless device 101 can select a customizable or user-defined alert type such as ringing, beeping, or vibrating, based on the classification information (step 209). The wireless device 101 alerts the user using the selected method (step 210). The display of the wireless device 101 may also be updated to reflect that a new message has arrived, such as by the display of standard or user-defined icons or sounds, the display of summarized message counts by type, or the display of the actual message itself as determined by the message priority and user-defined settings (step 211).

The method of the present invention as illustrated in FIG. 2 could also be implemented in another device on the network to which the wireless infrastructure 102 could route the incoming messages for processing before passing them on to the wireless device 101.

Figure 3:
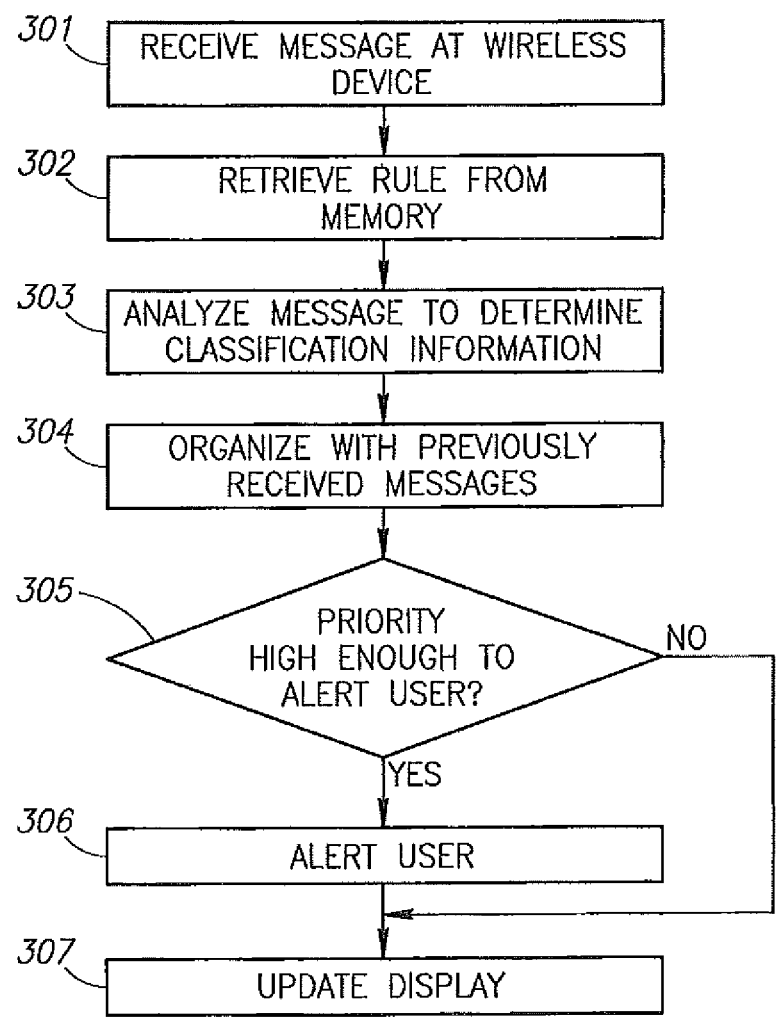
FIG. 3 is a flowchart illustrating an alternative implementation of the method of the present invention.

Alternatively, all of the processing could be done on the wireless device 101 itself as illustrated by the flowchart in FIG. 3. The wireless device 101 receives an incoming message from the wireless infrastructure 102 (step 301). The wireless device 101 then retrieves a predetermined set of rules corresponding to the user of the wireless device 101 from its own memory or alternatively from a database somewhere else in the network (step 302). The incoming message is then analyzed using the predetermined set of rules to determine classification information (step 303). Using this classification information, the wireless device 101 organizes the incoming message with the messages already stored on the wireless device 101 (step 304). The wireless device 101 also employs the predetermined rules to determine whether the incoming message is of sufficient priority to alert the user that it has arrived (step 305). If it is of sufficient priority, then the wireless device 101 alerts the user using well-known methods (step 306). In either case, the wireless device 101 updates its display to reflect the incoming message (step 307).

The rule sets of the present invention used to determine the classification information are typically predetermined by the user of the wireless device 101. The user can input and modify these rules using any of a variety of well-known systems including calling into an interactive voice response system or a system that responds to touch-tone key presses, using software carried on the wireless device 101 itself, or using a computer interface via the Internet or World Wide Web. These rules could be very simple in nature, with the user's choices limited to a few very general rules based on a few criteria, for example, message type or message origin. Alternatively, the user could be given the option of creating sophisticated rules that would allow the incoming messages to be searched for key words or phrases, or that would use different rules depending on time of day, day of the week, source of message, etc. The present invention could also be implemented with nested categories. For example, all email messages could be grouped under an "email" category and within that category the email messages could be grouped again as "work" or "personal" email.

For example, one potential rule would analyze an incoming email message and extract the email address of the originator. This address could then be cross-referenced with a built-in address book on the wireless device to locate the category that the individual corresponding to the email address has been classified under in the address book. The email message could then be classified under the same category.

The kind of classification information that can be obtained from the incoming message will vary based on the type or format of the message, but typical information may include type, origin, time received, and size. Certain message formats, such as email, can provide further information including, for example, full text searching of the content of the message. More sophisticated systems could be implemented to search voicemail messages for keywords through the use of voice recognition technology. Those of skill in the art will easily be able to determine additional kinds of information that can be extracted from incoming messages for use as classification information based on the type of message.

The display of the wireless device 101 can be updated to inform the user of the results of the classification, organization, and prioritization steps in a variety of ways. The display of the wireless device 101 could show the number of messages under each of the categories defined by the rule sets. Alternatively, the display could organize the messages by priority level, time received, or any other externally defined or user-defined item of classification information.

The method of the present invention can be implemented using any well-known programming language and techniques. The implementation on the wireless device 101 may be particularly suited to using Wireless Application Protocol (WAP) Forum defined standards, such as Wireless Markup Language (WML). The use of rule sets to organize messages is well-known in the field of email software. Products like Microsoft Outlook 97 employ rules to direct incoming email messages to particular folders within the user's email box. Those of skill in the art will recognize how to implement the rule sets of the present invention to function in a similar fashion but without being limited to any one type of message.

The present invention is not limited to the specific embodiments described. It is expected that those skilled in the art will be able to devise other implementations that embody the principles of the present invention and remain within its scope.

The invention claimed is:

1. A method comprising:
receiving, by a system comprising a processor, a plurality of messages;
determining, by the system, a message from the plurality of messages that is associated with a particular format;
grouping, by the system, the message under a first category based on the message being associated with the particular format;
determining, by the system, that the message grouped under the first category is associated with a second category, wherein the first category and the second category are defined prior to the message being received;
grouping, by the system, the message under the second category such that the message is grouped under the first category and, within the first category, is further grouped under the second category;
facilitating, by the system, an update of a respective message count associated with the first category and the second category;
assigning, by the system, based on the first category and the second category, a priority to the message; and
electing, by the system, based on the priority assigned to the message, not to send, to a wireless device for which the message is destined, a communication alerting the wireless device of the message and instead saving the communication for later retrieval.

2. The method of claim 1, wherein the message is destined for the wireless device associated with a recipient, and wherein the method further comprises facilitating, by the system, an update of a display of the wireless device associated with the recipient to show the update of the respective message count associated with the first category and the second category.

3. The method of claim 1, wherein the respective message count includes a first message count for the first category and a second message count for the second category.

4. The method of claim 1, further comprising initiating sending, to the wireless device for which the message is destined, a communication indicating the first category and the second category.

5. The method of claim 1, wherein the system comprises a network device.

6. The method of claim 1, wherein the particular format is an email format.

7. A non-transitory computer-readable storage device comprising instructions that, when executed by a processor of a system, cause the processor to perform operations comprising:
receiving a plurality of messages;
determining a message from the plurality of messages that is associated with a particular format;
grouping the message under a first category based on the message being associated with the particular format;
determining that the message grouped under the first category is associated with a second category, wherein the first category and the second are defined prior to the message being received;
grouping the message under the second category such that the message is grouped under the first category and, within the first category, is further grouped under the second category;
facilitating an update of a respective message count associated with the first category and the second category;
assigning, based on the first category and the second category, a priority to the message; and
electing, based on the priority assigned to the message, not to send, to a wireless device for which the message is destined, a communication alerting the wireless device of the message and instead saving the communication for later retrieval.

8. The non-transitory computer-readable storage device of claim 7, wherein the message is destined for the wireless device associated with a recipient, and wherein the operations further comprise facilitating an update of a display of the wireless device associated with the recipient to show the update of the respective message count associated with the first category and the second category.

9. The non-transitory computer-readable storage device of claim 7, wherein the respective message count includes a first message count for the first category and a second message count for the second category.

10. The non-transitory computer-readable storage device of claim 7, wherein the operations further comprise initiating sending, to the wireless device for which the message is destined, a communication indicating the first category and the second category.

11. The non-transitory computer-readable storage device of claim 7, wherein the particular format is an email format.

12. A system comprising:
a processor; and
a non-transitory computer-readable medium that stores instructions that, when executed by the processor, cause the processor to perform operations comprising:
receiving a plurality of messages,
determining a message from the plurality of messages that are associated with a particular format;
grouping the message under a first category based on the message being associated with the particular format;
determining that the message grouped under the first category is associated with a second category, wherein the first category and the second category are defined prior to the message being received,
grouping the message under the second category such that the message is grouped under the first category and, within the first category, is further grouped under the second category,
facilitating an update of a respective message count associated with the first category and the second category,
assigning, based on the first category and the second category, a priority to the message, and
electing, based on the priority assigned to the message, not to send, to a wireless device for which the message is destined, a communication alerting the wireless device of the message and instead saving the communication for later retrieval.

13. The system of claim 12, wherein the wireless device is associated with a recipient, and wherein the operations further comprise facilitating an update of a display of the wireless device associated with the recipient to show the update of the respective message count associated with the first category and the second category.

14. The system of claim 12, wherein the respective message count includes a first message count for the first category and a second message count for the second category.

15. The system of claim 12, wherein the operations further comprise initiating sending, to the wireless device for which the message is destined, a communication indicating the first category and the second category.

16. The system of claim 12, wherein the particular format is an email format.

* * * * *